(No Model.) 4 Sheets—Sheet 4.
J. W. BROWN & J. W. BROWN, Jr.
APPARATUS FOR LOADING AND UNLOADING VESSELS.
No. 263,847. Patented Sept. 5, 1882.
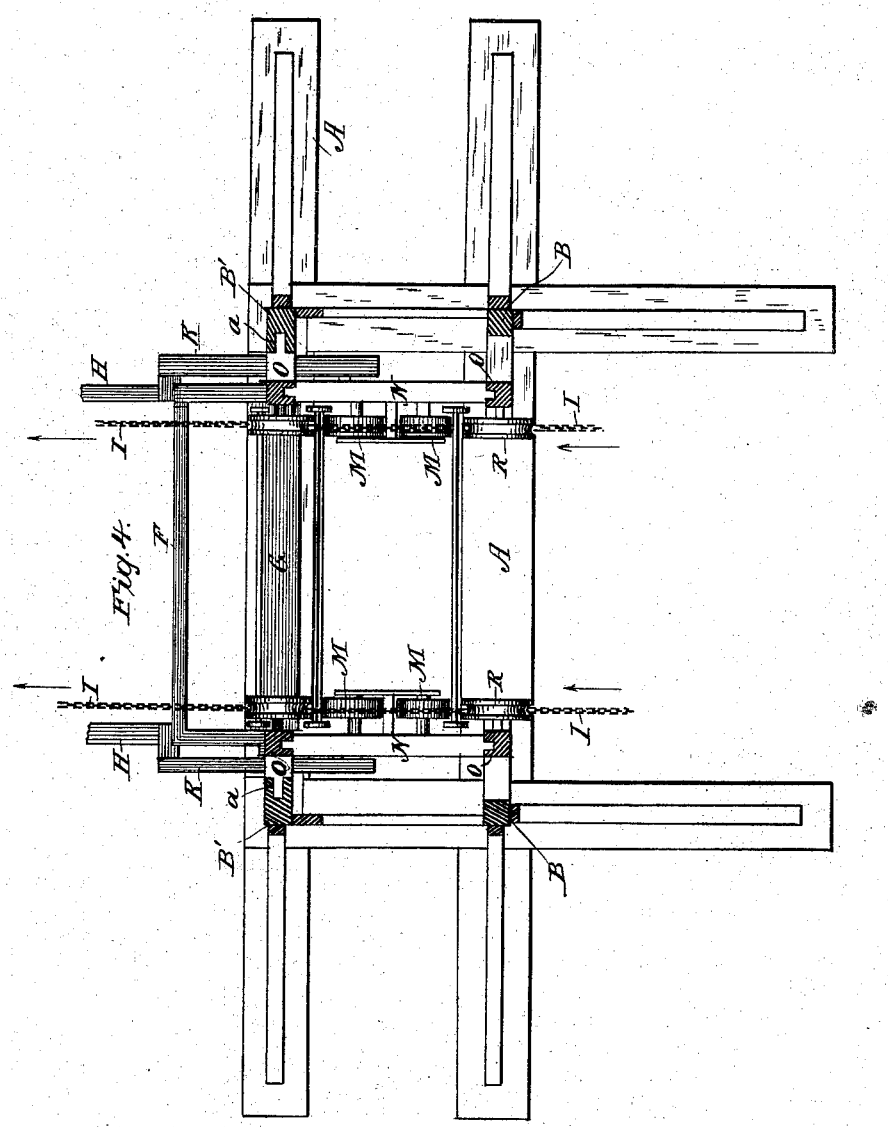
WITNESSES:
Fred. G. Dieterich
Edw. W. Byrn
INVENTOR:
Jno. Wilson Brown
Jno. Wilson Brown Jr.
BY
ATTORNEYS.

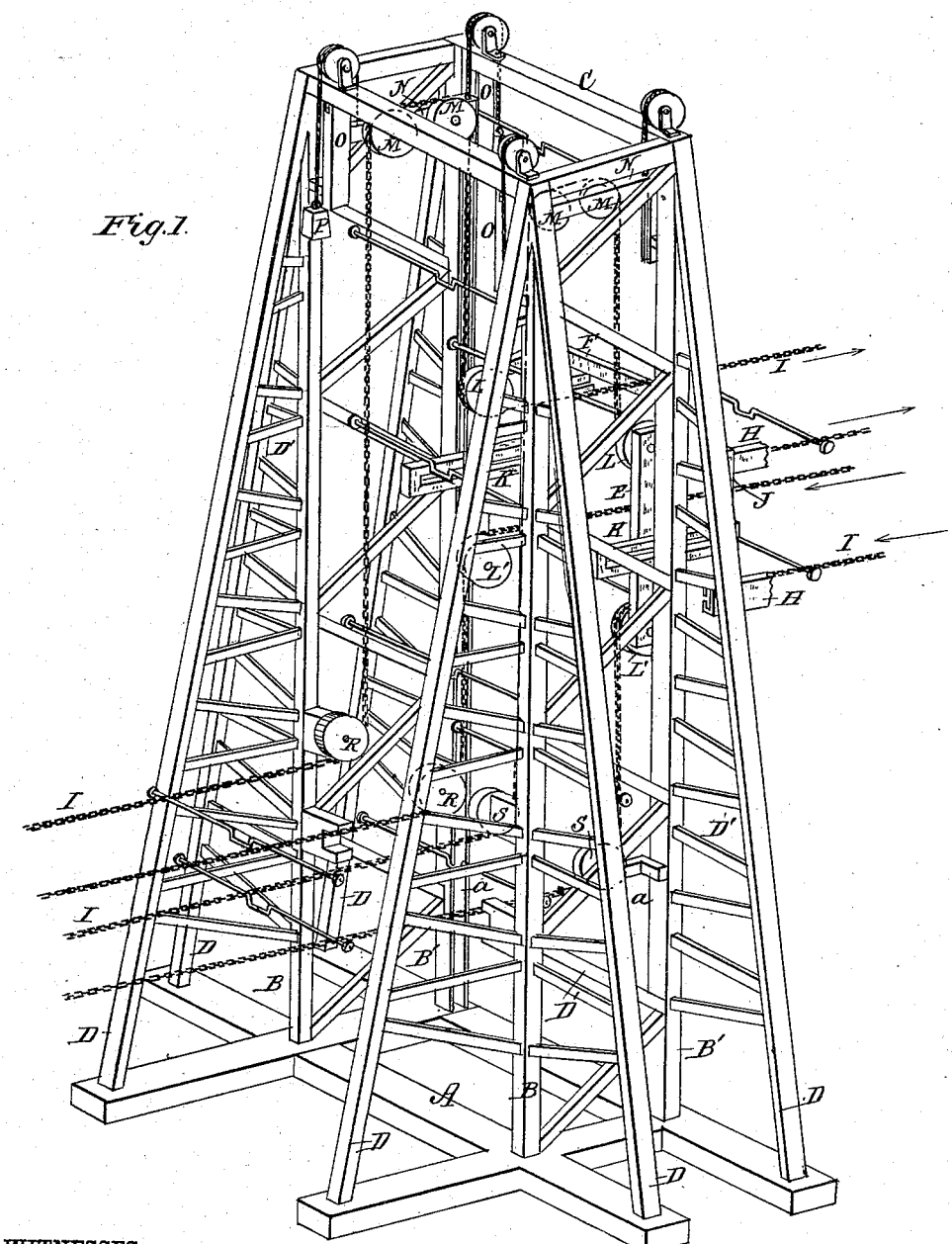

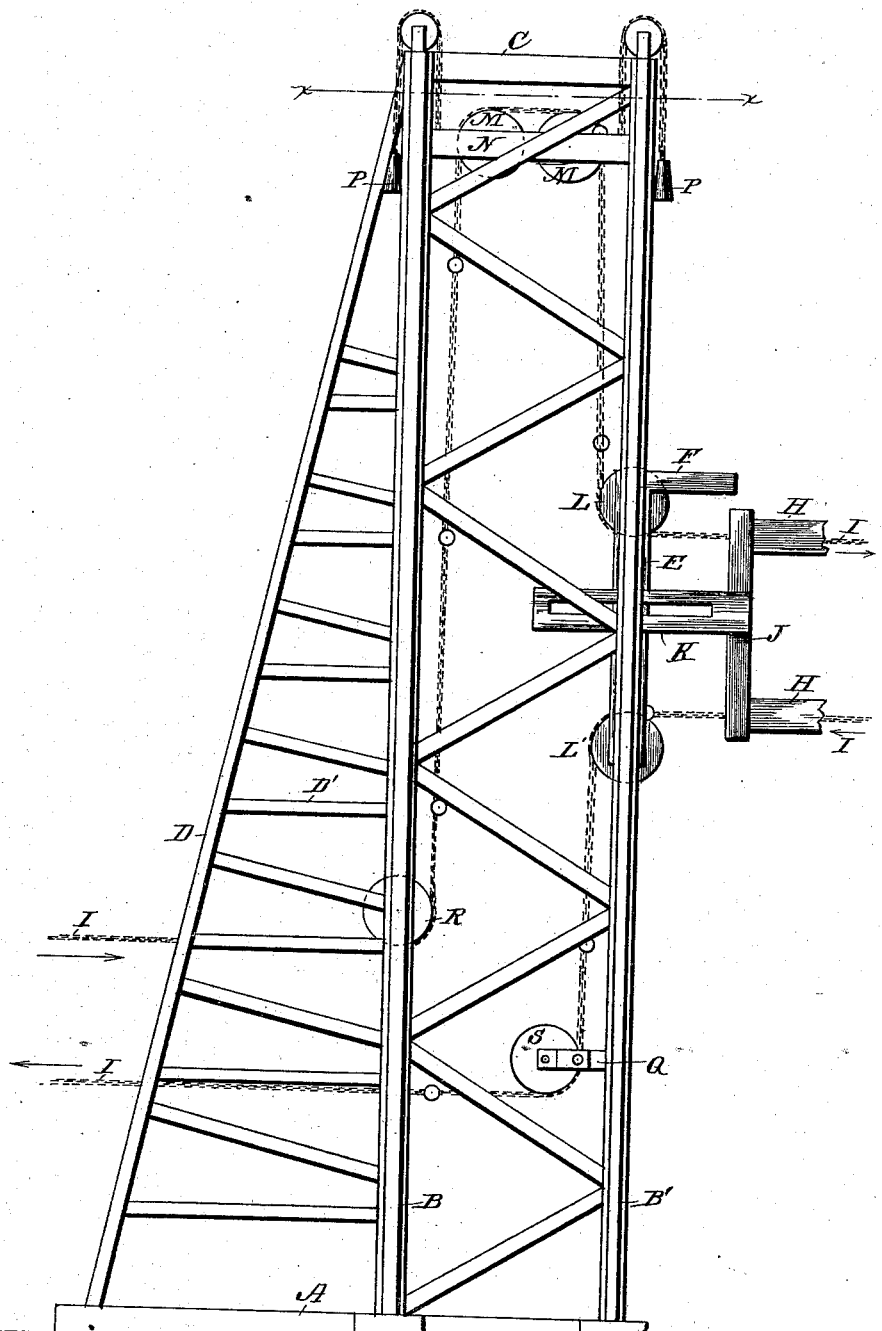

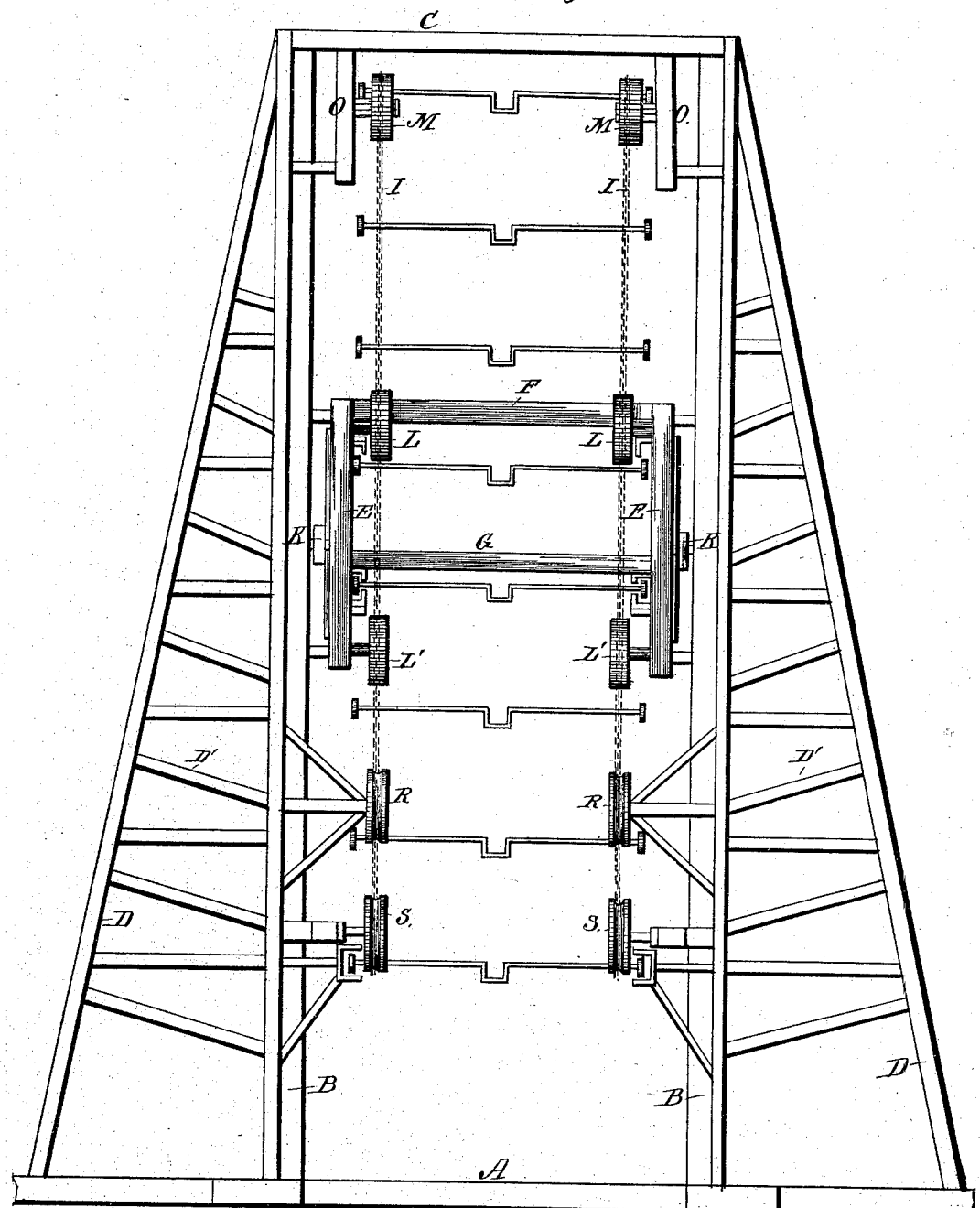

UNITED STATES PATENT OFFICE.

JOHN WILSON BROWN AND JOHN WILSON BROWN, JR., OF BALTIMORE, MD.

APPARATUS FOR LOADING AND UNLOADING VESSELS.

SPECIFICATION forming part of Letters Patent No. 263,847, dated September 5, 1882.

Application filed June 26, 1882. (No model.)

*To all whom it may concern:*

Be it known that we, JOHN WILSON BROWN and JOHN WILSON BROWN, Jr., of Baltimore city, State of Maryland, have invented a new and Improved Apparatus for Loading and Unloading Vessels; and we do hereby declare that the following is a full, clear, and exact description of the same, reference being had to the accompanying drawings, forming part of this specification.

In another application filed the same day herewith, and marked "Case A," we have described and shown an apparatus to be placed on a ship over the hatchway, in which is combined an extensible derrick-frame, with an endless carrier running around it and down into the hold of the vessel, upon which carrier the packages in the hold were slung and then raised and carried toward shore.

Our present invention is in the nature of an apparatus to be used in connection with the foregoing apparatus, and around and through this apparatus passes the carrier as it comes from the vessel, the object being to lower and deposit the freight after it gets on the wharf, or to lower it and then carry it farther inshore, where it may be less in the way.

It consists in an elevated frame-work provided with pulleys and an adjustable tension-frame and adjustable guides for the carrier, whereby means are provided for the variation in the vessel's position due to shifting sidewise or endwise and to the rising of the vessel from unloading or variation in the tides, as will be hereinafter fully described.

Referring to the drawings, Figure 1 is an isometric projection in perspective; Fig. 2, a side elevation; Fig. 3, a front elevation; and Fig. 4 is a cross-section through the line $x\ x$ of Fig. 2, looking downwardly.

A represents the base-frame, consisting of two parallel horizontal bars crossed at right angles upon two other parallel horizontal bars. This base-frame may be mounted upon rollers or placed on wheels on a railway-track running parallel to the edge of the wharf. From the four corners of the rectangular portion of the base-frame rise four posts, B B B' B', which at the top are connected by a rectangular frame, C, and are braced by the six oblique braces, D, with struts D'. In the back part of the frame, in the two corner-posts B' B', are two grooves, $a$, facing each other, which form guides for a frame, E F G, Figs. 1, 2, 3, which is provided with pins moving in said grooves $a$.

H H are the horizontal guide-rails for the carrier I, which rails at one end are supported on the vessel, and at the other are connected together by vertical bars J, and support the frame E F G by means of a slotted bar, K, on each side, which slotted bar incloses one of the pins that hold the frame E F G in the grooves $a$. The object in making this connection by the slotted bars K is to allow the carrier-rails H to have a longitudinal movement to accommodate the swinging of the ship to or from the frame A B'.

In the vertical bars of frame E F G are arranged four pulleys, L L and L' L', the upper ones, L, of which are just far enough above the lower ones, L', to bring their adjacent edges in line with the incoming and outgoing portions of the carrier I. The vertical adjustment of the frame E F G accommodates the rise and fall of the vessel, and does this without any change in the length of the carrier.

In the top part of the main frame are arranged four pulleys, M, which are journaled in bars N, whose ends are guided in vertical grooves in corner-pieces O at the top of the frame. These bars are strained upward by weights P, connected thereto by cords passing over pulleys, the object of which is to hold the carrier in uniform tension and compensate for the movement of the vessel away from or toward the wharf. Thus when the vessel moves away from the wharf and a draft-strain is put on the carrier the pulleys M are drawn down against the gravity of the weight, and vice versa. This keeps the carrier in even tension and avoids breaking strain and the disarrangement of the frame A B'.

In the lower part of the frame-posts B' are arranged stationary pulleys S, placed on offsets Q, so as to allow the frame E F G to pass them, and upon the other post, B, are also two pulleys, R R.

Now the carrier being loaded with packages and set in motion, as described in Case A, it passes over the pulleys L' L' at the bottom of the frame E F G, then, descending, passes under the pulleys S, at which point the packages may be dumped or deposited, if desired; but if the merchandise is to be carried back from the edge of the wharf to a point farther on shore, the packages are allowed to remain on the carrier, which runs farther ashore to a set of pulleys (not shown) fixed in a stationary frame-work, at which point they are taken off or automatically dumped. The carrier, then returning, passes under pulleys R, thence up and over the pulleys M, and thence down and under pulleys L, and thence horizontally into the guide-rails to the vessel again.

Having thus described our invention, what we claim as new is—

1. The combination of the main frame having posts B' B', with grooves $a$, the vertically adjustable frame E F G, bearing pairs of pulleys L L', the endless carrier I, and the slotted bars K, connected to the guide-rails for the carrier, substantially as described, for the purpose of permitting a vertical and a horizontal adjustment of the carrier-rails, as described.

2. The combination, with the endless carrier I and the main frame A B B', having guide-pulleys for the carrier, of the automatically-adjustable pulleys L L' at the top, for the purpose of avoiding breaking strain from the movement of the vessel and securing a uniform tension for the carrier, as described.

3. The combination of the main frame A B B' with pulleys R and S, the automatically-adjustable pulleys L L' at the top of the frame, the vertically-adjustable frame E F G, bearing guide-pulleys, and the slotted bar K, the said frame, with its pulleys and slotted bars, being arranged between the pulleys L and R, substantially as and for the purpose described.

4. A frame located on shore and provided with pulleys and carrier-guides, combined with an independent and vertically-moving frame having horizontal carrier-guides, and a carrier passing from the latter to the former in any of its adjustments, as described.

JOHN WILSON BROWN.
JOHN WILSON BROWN, JR.

Witnesses:
FELIX R. SULLIVAN,
FRANK SULLIVAN.